United States Patent [19]

de Morais Zoio

[11] Patent Number: 4,901,514
[45] Date of Patent: Feb. 20, 1990

[54] FRUIT HARVESTING AND COLLECTING APPARATUS

[76] Inventor: Luis G. de Morais Zoio, Rua Candido Reis, Lote 4, Carcavelos, Portugal

[21] Appl. No.: 303,239

[22] Filed: Jan. 30, 1989

Related U.S. Application Data

[63] Continuation-in-part of Ser. No. 894,033, Aug. 7, 1986, abandoned.

[30] Foreign Application Priority Data

Aug. 9, 1985 [PT] Portugal .................................. 80931

[51] Int. Cl.$^4$ ............................................ A01D 46/26
[52] U.S. Cl. ...................................... 56/340.1; 56/329
[58] Field of Search ............. 56/16.5, 328 R, 328 TS, 56/329, 332, 300, 340.1

[56] References Cited

U.S. PATENT DOCUMENTS

| | | | |
|---|---|---|---|
| 3,496,705 | 2/1970 | Perrelli | 56/328 R |
| 3,635,004 | 1/1972 | Webb et al. | 56/340.1 |
| 3,964,244 | 6/1976 | Vallicella | 56/340.1 |
| 4,269,021 | 5/1981 | Friday | 56/329 |
| 4,377,064 | 3/1983 | Peterson | 56/328 R |
| 4,545,187 | 10/1985 | Landgraf | 56/340.1 |

FOREIGN PATENT DOCUMENTS 2327719 5/1977 France ............................ 56/340.1

*Primary Examiner*—Stephen J. Novosad
*Assistant Examiner*—Terry Lee Melius
*Attorney, Agent, or Firm*—Staas & Halsey

[57] ABSTRACT

An apparatus for harvesting fruit from trees has an arch-shaped structure includes a plurality of interconnecting tubes. The structure surrounds two sides and the top of the tree from which fruit is to be harvested. Cables are attached to the structure and are connected together at handles on either side of the structure. Alternate pulling of the handles by operators make the cables and the structure come in contact with the tree, and through this contact and subsequent vibration the fruit falls from the tree. The fruit is prevented from flying out of the immediate area of the structure by protection panels mounted on the outside of the structure. Drop panels surround the tree trunk for catching the fallen fruit. At least one cable is attached to the drop panel via the structure to one of the handles so that the manipulation of the handles lifts the drop panels and directs the fallen fruit toward discharge areas in the drop panels.

6 Claims, 4 Drawing Sheets

FRUIT HARVESTING AND COLLECTING APPARATUS

This is a continuation-in-part of U.S. application Ser. No. 894,033 filed Aug. 7, 1986, now abandoned.

BACKGROUND OF THE INVENTION

1. Field of the Invention

The present invention relates to a non-vibratory system for beating trees and collecting fruit therefrom, and more particularly, for collecting olives, although it can also be used for picking almonds or other kinds of fruit such as citrus fruits, coffee, etc.

2. Description of the Related Art

Several methods for picking fruit are already known, ranging from manual to mechanical and chemical methods.

One method for the manual picking and/or collecting of fruit involves beating trees with a stick. One of many drawbacks is that a considerable amount of manual labor is required, which is becoming increasing expensive. Further, this method is rather slow, and this also has a bearing on the final cost of the product. Furthermore, the manual beating of a tree is not uniformly carried out. This may cause serious damage to the tree, to the branches thereof and to the buds of the next generation of fruit, as is the case with olive trees.

The various mechanical methods known may also cause serious damage to the trees. In fact, methods are nowadays used which make trees vibrate from the trunk upwards, and in order to obtain the expected results, these vibrations have to be so strong that the whole tree structure is shaken. Other mechanical methods used to the same effect also cause considerable damage to the branches. The methods are, moreover, expensive, requiring sophisticated means.

Chemical methods are also extremely expensive and are only worth using for very large pickings. Also, due to environmental and pollution concerns, these methods require special conditions with regard to application, or at least that special care is taken.

All of these methods require a subsequent picking up of the fruit, this being another drawback of the known procedures.

The present invention completely overcomes all the disadvantages referred to above.

SUMMARY OF THE INVENTION

In view of the above, one of the objects of the invention is the use of a system for beating trees and collecting fruit therefrom which employs a minimum of manual labor in order to reduce the cost of harvesting.

Another object of the present invention is to provide a quick and efficient beating operation for harvesting fruit.

Still another object is to provide automatic collection of the harvested fruit.

A further object of the invention is to provide a low cost tree harvesting system.

Yet another object of the invention is to provide an easily transportable harvesting device.

According to the present invention, an apparatus for collecting fruit from a tree by beating the tree comprises an arch-shaped structure having a plurality of interconnected tubular elements for surrounding two sides and the top of the tree, a plurality of cables extending radially from both sides of the structure individually connected to separate portions of the structure, and a pair of handles, one on either side of the structure, for connecting together the cables on respective sides of the structure, so that manipulation of the handles causes motion of the cables and the structure.

The apparatus may also comprise a pair of rocking support elements on which either end of the arch-shaped structure is mounted for allowing rocking of the structure. The tubular elements may also be telescopic, so that the sides of the structure can be adapted to individual trees. Adjustable wheels may also be mounted on the rocking support elements for enabling easy transport of the structure from one tree to another. The device may also comprise interconnecting ground panels which surround the trunk of the tree to be harvested and are connected to one of the handles via the structure by one of the cables so that the harvested fruit moves toward discharge openings for collection when the handles are manipulated, and protection panels mounted on the structure surrounding the exterior of the structure so that the harvested fruit is maintained within an immediate area when detached from the tree. The cables may be attached to upper portions of the structure.

Other object and features of the present invention will become apparent in the course of the following specification which, in order to allow a better understanding of the invention, is based on the attached drawings.

DESCRIPTION OF THE PREFERRED EMBODIMENT

Figure 1:
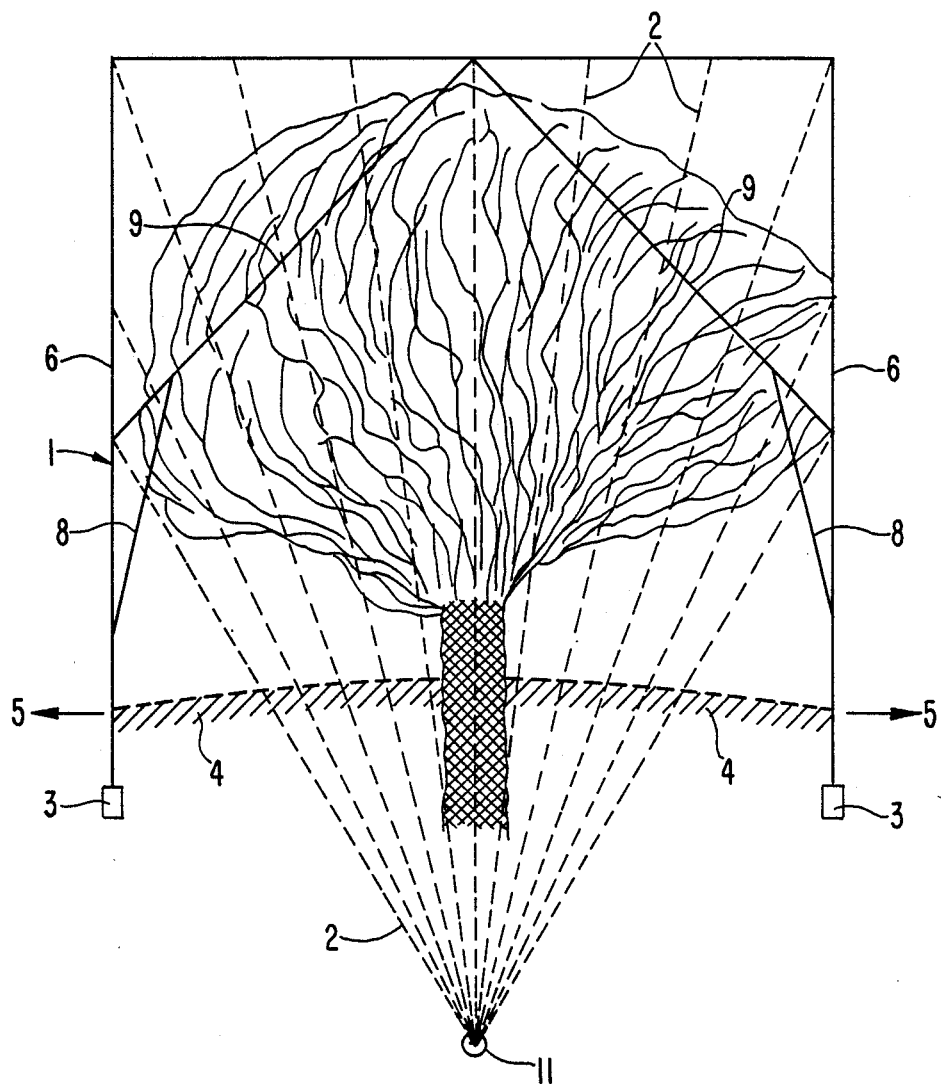
FIG. 1 an elevational view of a preferred the present invention.

As is illustrated in the drawings, the present invention comprises an arch-type structure 1 comprising a number of interconnecting elements of adequate size which form the structure 1. This structure 1 surrounds two sides and the top of a tree to be harvested, as illustrated in FIG. 1.

Figure 2:
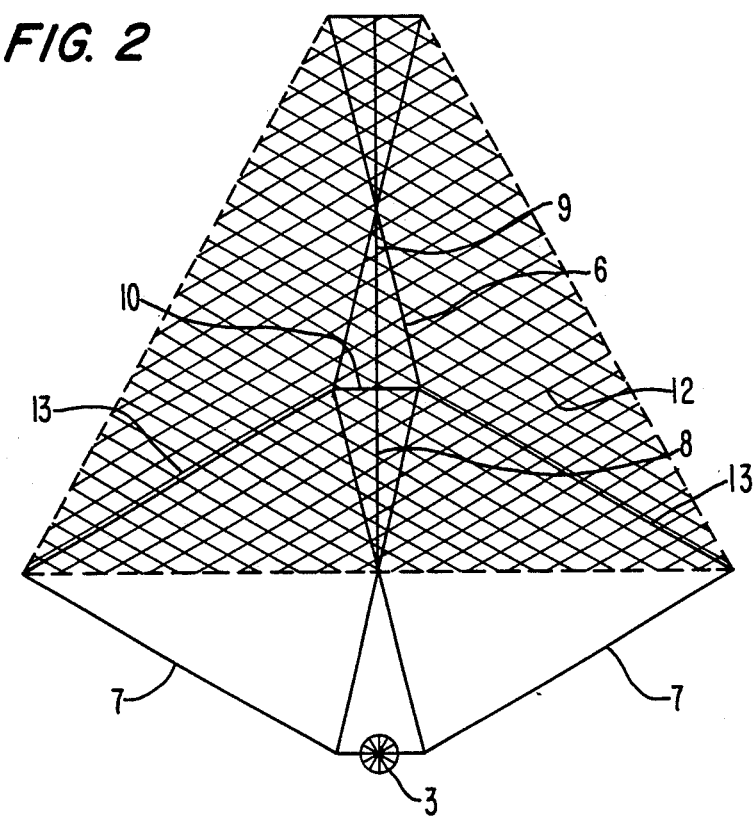
FIG. 2 a side elevational view of the embodiment illustrated in FIG 1.

Referring now to FIGS. 1 and 2, the structure 1 comprises a tubular frame consisting of several first tubular elements 6 which, according to their size and/or number, ensure that the frame reaches a certain height. The first tubular elements 6 are nearly vertical, and provide primary support for the structure 1. Support elements 7 rest on the ground, and support the first tubular elements 6. The support elements 7 are constructed as the bases supporting either end of the structure 1 so that the entire structure can rock from side to side during a harvesting operation. Lateral support elements 13 connect the main portion of the structure 1 to the outer reaches of the support elements 7 to provide lateral support for the structure 1. The structure 1 also comprises overhead tubular elements 9, which form the main overhead portions of the structure 1, as illustrated in FIG. 1. The overhead tubular elements 9 connect directly to the first tubular elements 6, and are further supported by bracing elements 8. Referring to FIG. 2, cross-bracing elements 10 also support the overall structure 1. The use of a plurality of the above-mentioned elements interconnected as illustrated in FIG. 2 ensures the necessary rigidity of the structure 1 for adequate functioning of the device.

Figure 3A:
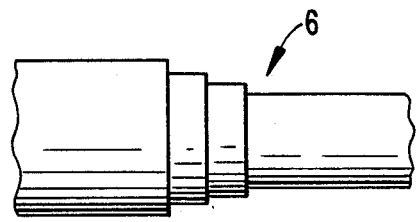
FIGS. 3A and 3B show a telescopic tubular element used in the present invention in non-extended and extended states, respectively.
Figure 3B:
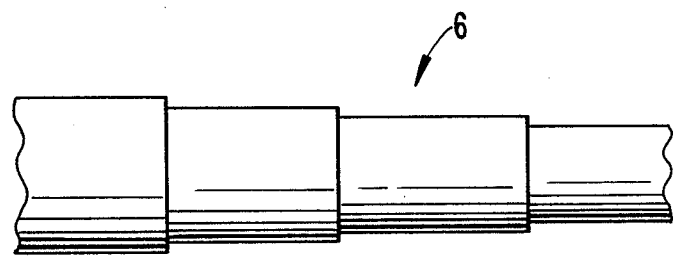

The above-mentioned elements, in particular the first tubular elements 6, the support elements 7, the bracing elements 8, the overhead tubular elements 9 and the cross-bracing elements 10 may be telescopic and therefore, extendable. This feature is quite useful when dealing with trees of varying heights. The structure may be scaled up or scaled down to conform with the height of the individual tree by telescoping the elements as needed. A typical locking telescopic tube is illustrated in extended and unextended states in FIGS. 3A and 3B, respectively.

The present embodiment also comprises cables to attach to the structure 1 at locations on middle and upper sections of the structure 1. The cables slide along or between the tubular elements. These cables 2 are provided with handles 11 at their ends on either side of the structure 1 so as to allow easy handling of the cables tube by operators. Only two operators, one on either side of the structure 1, are required to ensure the movement and beating by the cables 2 and of the structure 1 against the branches of the tree. This beating causes fruit to fall from the tree.

By attaching the cables 2 directly to convenient sections of the structure 1 by means of large embracing loops, longitudinal forward and backward movements of the cables 2 along the sections are permitted. The actual course of each cable 2 is restricted by other sections of the structure 1. The longitudinal forward and backward movements of the cables 2 are the result of the effort exerted by the operators in coordination with the rocking movement of the structure 1. In this way, the cables 2 beat the branches of the tree, causing the fruit to fall.

Alternatively, the cables 2 can be attached indirectly to the structure 1. The cables 2 are connected by means of pulleys (not shown) to auxiliary cables (not shown). The auxiliary cables are attached to the structure 1. In this way, additional movement and contact is caused, as the structure 1 rocks, the cables 2 have some independent movement relative to the structure 1, and the auxiliary cables move relative to the cables 2 and the structure 1 as well.

When one of the cables 2 contacts one of the branches of the tree during the rocking motion, vibration of the entire branch and adjoining branches is caused. Unlike mechanically shaking the trunk of the tree, the beating of the branches does not effect the entire system of the tree. That is, the root structure and the trunk of the tree remain relatively unaffected during a harvesting operation. By alternately pulling the cables 2 back and forth, the operators cause the rocking of the entire structure 1 on the support elements 7. In the course of the rocking movement caused by the alternate motion of the structure 1 by the two operators, the structure 1 itself and the cables 2 will come into contact with the branches of the tree, producing a beating movement which is transmitted throughout the branches of the tree.

The structure 1 is provided with wheels 3 mounted on the support elements 7. The wheels 3 enable the harvesting device to be quickly moved from one tree to another.

As has been discussed above and may be observed in FIG. 2, the structure 1 includes support elements 7 which, besides the strengthening the vertical structure via lateral supports 13, keep structure 1 balanced and allow the rocking movement referred to above.

Figure 4:
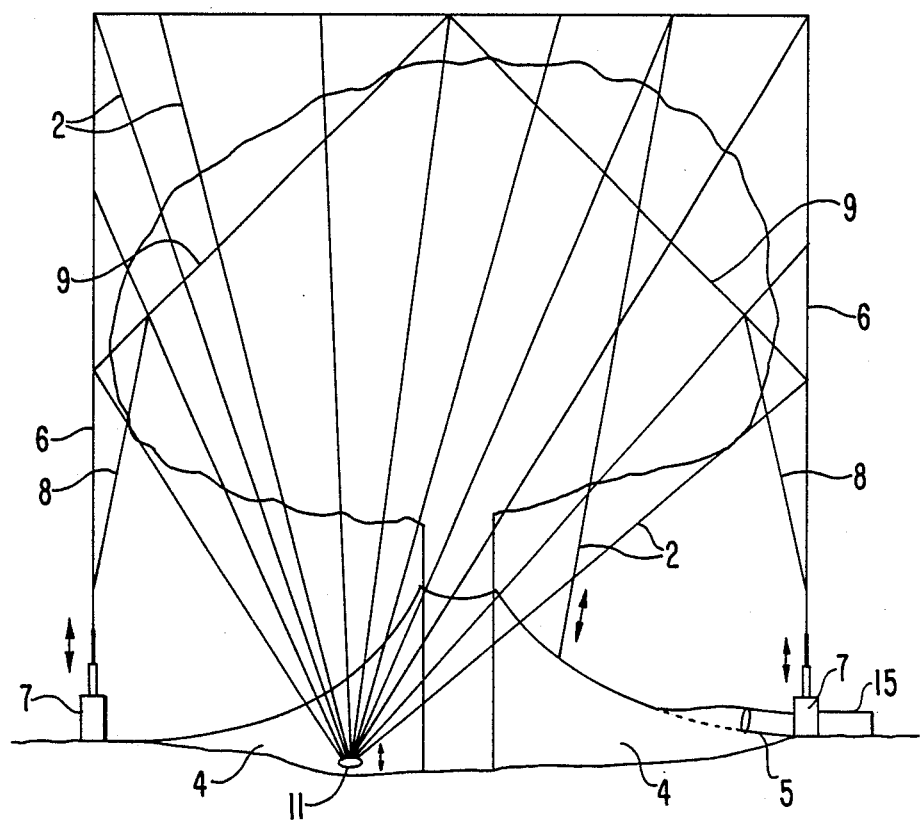
FIG. 4 is an elevational side view showing the invention utilizing a telescopic first tubular element, drop panels and connecting cables.

As illustrated in FIG. 4, flexible drop panels 4 are also provided which completely surround the tree trunk when extended. These panels 4 catch the fruit that has fallen due to the beating movements of the cables 2 and the structural 1 against the branches of the tree. The panels 4 are structured so as to guide the fallen fruit to discharge openings 5. The fruit is automatically guided to the discharge openings 5 by attaching one end of one of the cables 2 (the other end being attached to one of the handles 11) via the top portion of the structure 1 to a top portion of the panels near the trunk of the tree. Accordingly, when the handle 11 to which this particular cable 2 is attached is pulled by one of the operators, the panels 4 are lifted in the vicinity of the trunk. The discharge openings 5 are situated so that they are at the lowest possible points of the panels 4. In this way, the invention uses gravity to move the fallen fruit off the panels 4 into the discharge openings 5. The discharge openings 5 open into some type of collector 15 for collecting the harvested fruit. One or more discharge opening 5 and collector 15 may be used as needed to allow for more efficient operation.

Protection panels 12 prevent the scattering of the fruit as it becomes detached from the tree. The protection panels 12 are constructed from a flexible material, so as not to dampen the motion of the structure 1 during the beating process. Protection panels 12 surround the frame of the structure 1 as illustrated in FIG. 2.

Various minor modifications could be made from the details of construction of the preferred embodiments shown and described herein for illustrative purposes, without departing from the real essence of the invention. Thus, it is intended that the present invention cover the modification and variations of the harvesting apparatus in accordance with the invention within the scope of the appended claims and their equivalents without limitation to the different environments in which to use harvesting devices.

What is claimed is:

1. An apparatus for collecting fruit from a tree by contacting the tree, comprising:
   an arch-shaped structure having a plurality of interconnected tubular elements for surrounding two sides and the top of the tree;
   a plurality of cables connected to said structure and extending radially from two sides thereof; and
   a pair of handles one on either side of said structure, for connecting together said cables on either side of said structure, so that manipulation of said handles causes motion of said cables and said structure and contact of said cables and said structure with the tree.

2. An apparatus for collecting fruit from a tree according to claim 1, further comprising a pair of rocking support elements, one at each side of said structure, said structure being mounted on said rocking support elements so that manipulation of said handles causes said structure to rock.

3. An apparatus for collecting fruit from a tree according to claim 1, wherein said tubular elements are telescopic, so that said structure can be adapted in size for individual trees.

4. An apparatus for collecting fruit from a tree according to claim 2, further comprising adjustable wheels mounted on said rocking support elements for enabling easy transport of said structure.

5. A system for collecting fruit from a tree according to claim 1, further comprising:
   interconnecting flexible ground panels which surround the trunk of the tree to be harvested and are connected to one of said handles via said structure by one of said cables;
   fruit collection means for collecting fruit which has fallen to said ground panels upon manipulation of said handles; and
   protection panels mounted on said structure surrounding the exterior of said structure so that fruit shaken from the tree is maintained within the area of said ground panels after being detached from the tree.

6. An apparatus for collecting fruit according to claim 1, wherein said cables are attached to upper portions of said structure.

* * * * *